United States Patent
Kubota (10) Patent No.: US 8,900,026 B2
(45) Date of Patent: Dec. 2, 2014

(54) METHOD OF MANUFACTURING LIQUID CRYSTAL DISPLAY DEVICE

(71) Applicant: Japan Display Inc., Minato-ku (JP)

(72) Inventor: Naoya Kubota, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/138,607

(22) Filed: Dec. 23, 2013

(65) Prior Publication Data
US 2014/0179192 A1 Jun. 26, 2014

(30) Foreign Application Priority Data
Dec. 26, 2012 (JP) .................................. 2012-282862

(51) Int. Cl.
*H01J 9/26* (2006.01)
*G02F 1/1341* (2006.01)

(52) U.S. Cl.
CPC .................................. *G02F 1/1341* (2013.01)
USPC ............................... 445/25; 445/24; 349/156

(58) Field of Classification Search
USPC ....................................... 445/24, 25; 349/156
See application file for complete search history.

(56) References Cited

U.S. PATENT DOCUMENTS

| 5,381,255 | A | * | 1/1995 | Ohnuma et al. | ............... | 349/106 |
| 5,946,070 | A | * | 8/1999 | Kohama et al. | ............... | 349/156 |
| 6,304,308 | B1 | * | 10/2001 | Saito et al. | ............... | 349/155 |
| 2001/0052960 | A1 | * | 12/2001 | Saito et al. | ............... | 349/155 |

FOREIGN PATENT DOCUMENTS

| JP | 2000-66206 | 3/2000 |
| JP | 2006-181418 | 7/2006 |
| KR | 2006-0116888 | 11/2006 |

OTHER PUBLICATIONS

Official Action dated Sep. 30, 2014 in corresponding KR patent application 10-2013-19995 (with English translation).

* cited by examiner

*Primary Examiner* — Mary Ellen Bowman
(74) *Attorney, Agent, or Firm* — Oblon, Spivak, McClelland, Maier & Neustadt, L.L.P.

(57) ABSTRACT

According to one embodiment, a method of manufacturing a liquid crystal display device includes forming a first substrate including first display regions, forming a second substrate including second display regions, forming seal members of a loop shape around the first or second display regions, dropping a liquid crystal material onto the first or second display regions surrounded by the seal members, and bonding the first and second substrates to each other by the seal members such that the first display regions oppose the second display regions. In the dropping, a greater amount of liquid crystal material is dropped onto display regions close to ends of the first or second substrate, than onto display regions close to a center of the first or second substrate.

5 Claims, 6 Drawing Sheets

METHOD OF MANUFACTURING LIQUID CRYSTAL DISPLAY DEVICE

CROSS-REFERENCE TO RELATED APPLICATIONS

This application is based upon and claims the benefit of priority from Japanese Patent Application No. 2012-282862, filed Dec. 26, 2012, the entire contents of which are incorporated herein by reference.

FIELD

Embodiments described herein relate generally to a method of manufacturing a liquid crystal display device.

BACKGROUND

Liquid crystal display devices are produced by, for example, positioning and bonding, to each other, a first mother substrate, which is to be divided into a plurality of array substrates, and a second mother substrate, which is to be divided into a plurality of counter substrates, and then cutting display devices each having pairs of an opposing array substrate and counter substrate.

In each of the regions of the first mother substrate that will be divided into array substrates, there are provided a plurality of pixel electrodes arranged in a matrix, a plurality of scanning lines arranged along the rows of the pixel electrodes, a plurality of signal lines arranged along the columns of the pixel electrodes, and pixel switches configured to switch electrical connection between the signal lines and the pixel electrodes in accordance with the signals applied through the scanning lines.

In each of the regions of the first mother substrate that will be divided into array substrates, a driving circuit configured to drive display pixels via the scanning lines and signal lines, and various wirings to which video signals and control signals are input, are provided around a display section in which the pixel electrodes are arranged.

The first and second mother substrates are fixed, opposed to each other, by seal members that are formed, by tracing, around the display sections. A liquid crystal material is filled in the region between the first and second mother substrates that is enclosed by the seal member. In this state, the first and second mother substrates are divided at predetermined positions into a plurality of liquid crystal display devices.

DETAILED DESCRIPTION

Various embodiments will be described hereinafter with reference to the accompanying drawings. In general, according to one embodiment, there is provided a method of manufacturing a liquid crystal display device comprises forming a first mother substrate including a plurality of first display regions; forming a second mother substrate including a plurality of second display regions; forming seal members of a loop shape around the first or second display regions; dropping a liquid crystal material onto the first or second display regions surrounded by the seal members; and bonding the first and second mother substrates to each other by the seal members such that the first display regions oppose the second display regions. In the dropping the liquid crystal material, a greater amount of liquid crystal material is dropped onto display regions close to ends of the first or second mother substrate, than onto display regions close to the center of the first or second mother substrate.

A liquid crystal display device and its manufacturing method according to an embodiment will be described with reference to the accompanying drawings.

Figure 1:
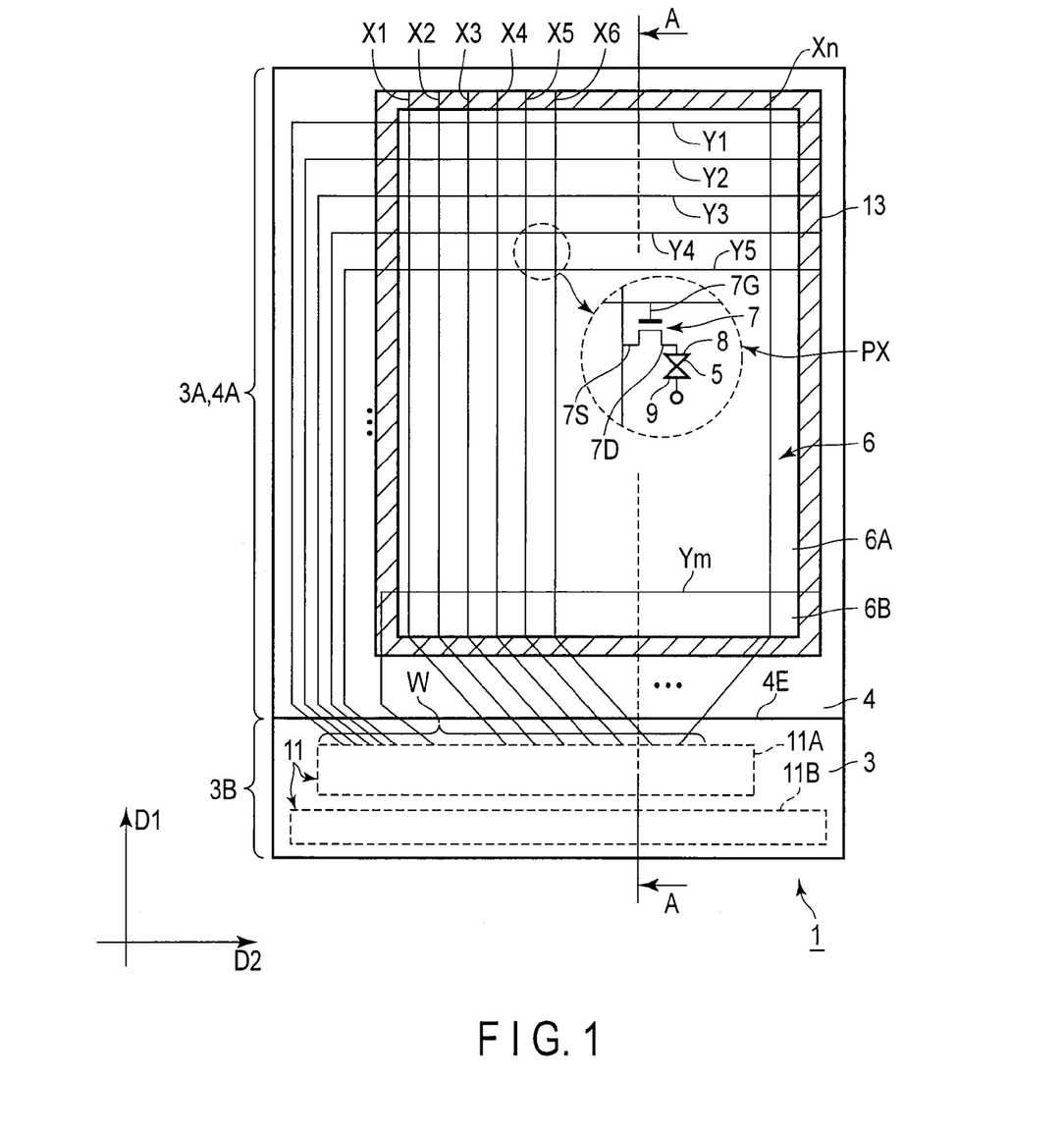
FIG. 1 is a schematic plan view showing a structure example of a liquid crystal display device according to an embodiment.
Figure 2:
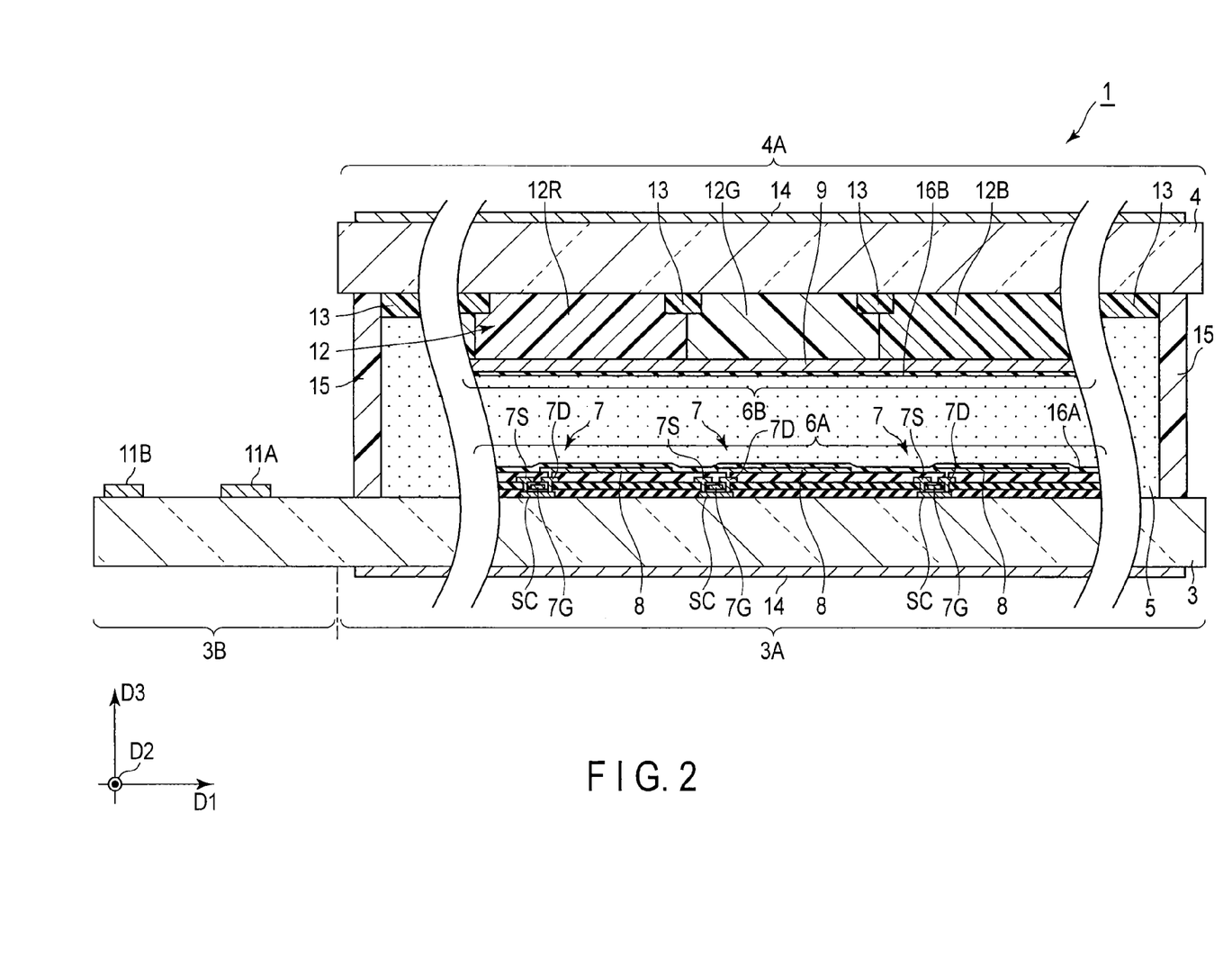
FIG. 2 shows a cross-sectional view of the liquid crystal display device according to the embodiment.

FIG. 1 is a schematic plan view showing a structure example of a liquid crystal display device according to an embodiment, and FIG. 2 shows a cross section example of the liquid crystal display device according to the embodiment.

As is shown in FIGS. 1 and 2, the liquid crystal display device of the embodiment comprises a substantially rectangular flat liquid crystal display panel 1. The liquid crystal display panel 1 comprises a pair of substrates, i.e., an array substrate 3 and a counter substrate 4, and a liquid crystal layer 5 held between the substrates as a light modulation layer.

The liquid crystal display panel 1 comprises a substantially rectangular display section 6. The display section 6 includes a plurality of display pixels PX arranged in a matrix.

The array substrate 3 includes a display region 6A as a part of the display section 6. In the display region 6A, there are provided wirings, such as a plurality of scanning lines Y (1, 2, 3, . . . , m) extending along the rows of the display pixels PX (in a second direction D2), and a plurality of signal lines X (1, 2, 3, . . . , n) extending along the columns of the display pixels PX (in a first direction D1). The display region 6A also includes switching elements 7 provided for the respective display pixels PX and located near the intersections of the scanning lines Y and the signal lines X, pixel electrodes 8 connected to the respective switching elements 7, and the like.

Each switching element 7 is formed of, for example, a thin-film transistor (TFT). The gate electrodes 7G of the switching elements 7 are electrically connected to the corresponding scanning lines Y (alternatively, the gate electrodes are formed integral with the corresponding scanning lines). The source electrodes 7S of the switching elements 7 are electrically connected to the corresponding signal lines X (alternatively, these electrodes are formed integral with the corresponding scanning lines). The drain electrodes 7D of the switching elements 7 are electrically connected to the corresponding pixel electrodes 8 of the display pixels PX. The surfaces of the pixel electrodes 8 are covered with an orientation film 16A. The semiconductor layers SC of the switching elements 7 are opposed to the gate electrodes 7G with respective insulating layers interposed therebetween, and are electrically connected between the source electrodes 7S and the drain electrodes 7D. The semiconductor layers SC are formed of polysilicon or amorphous silicon.

The array substrate 3 comprises a first region 3A opposing the counter substrate 4, and a second region 3B outwardly extending from an end 4E of the counter substrate 4. The first region 3A includes the display region 6A. The second region 3B includes a connection section 11 to be connected to a driving signal source that is configured to supply a driving signal to the display section 6, and a plurality of wiring W led from the display region 6A to the connection section 11. The connection section 11 includes, for example, a first connection section 11A in which a driving IC chip as the driving signal source can be provided, and a second connection section 11B that can be connected to a flexible printed circuit board (FPC) as the driving signal source. The wiring W corresponds to part of, for example, common wiring for supplying a common potential, as well as the signal lines X and the scanning lines Y.

The counter substrate 4 comprises an effective region 4A opposing the first region 3A of the array substrate 3. The effective region 4A includes a display region 6B providing part of the display section 6. The display region 6B includes a counter electrode 9 corresponding in common to all display pixels PX, and the like. The counter electrode 9 is formed of a conductive material having optical transparency, such as indium tin oxide (ITO). The counter electrode 9 is coated with an orientation film 16B.

The array substrate 3 and the counter substrate 4 are arranged such that the orientation film 16A on the pixel electrodes 8 opposes the orientation film 16B on the counter electrode 9, and are adhered to each other by a seal member 15, with the liquid crystal layer 5 sealed between the substrates. The seal member 15 is of a loop shape and surrounds the display section 6. The seal member 15 is formed of, for example, a UV-curable resin material, but may be formed of a thermoset resin or the combination of these materials.

The array substrate 3 and the counter substrate 4 are opposed to each other, with a predetermined gap defined therebetween by spacers SS (not shown) provided on the substrate 3 or 4, and are adhered to each other by the seal member 15.

The liquid crystal layer 5 is formed of a liquid crystal material sealed between the array substrate 3 and the counter substrate 4.

Polarizing plates 14 are attached to the major surface of the array substrate 3 in the first region 3A and that of the counter substrate 4 in the effective region 4A, the major surfaces being located away from the liquid crystal layer 5.

In the case of a color display type liquid crystal display device, the liquid crystal display panel 1 comprises different types of display pixels, such as red pixels for displaying red, green pixels for displaying green, and blue pixels for displaying blue, as shown in FIG. 2. More specifically, the red pixels include a red filter 12R for passing therethrough light of a dominant wavelength corresponding to red. Similarly, the green pixels include a green filter 12G for passing therethrough light of a dominant wavelength corresponding to green. The blue pixels include a blue filter 12B for passing therethrough light of a dominant wavelength corresponding to blue. A color filter layer 12 comprising these color filters 12R, 12G and 12B is provided on the liquid-crystal-layer-side major surface of the counter substrate 4 in the effective region 4A.

As is shown in FIGS. 1 and 2, light-shielding layers 13 are formed between the color filters 12R, 12G and 12B (i.e., between the display pixels), and around the display region 6B. The light-shielding layers 13 formed between the color filters 12R, 12G and 12B are arranged to oppose the signal lines X and the scanning lines Y on the array substrate 3. The light-shielding layers 13 are formed of, for example, a resin colored in black.

Figure 3:
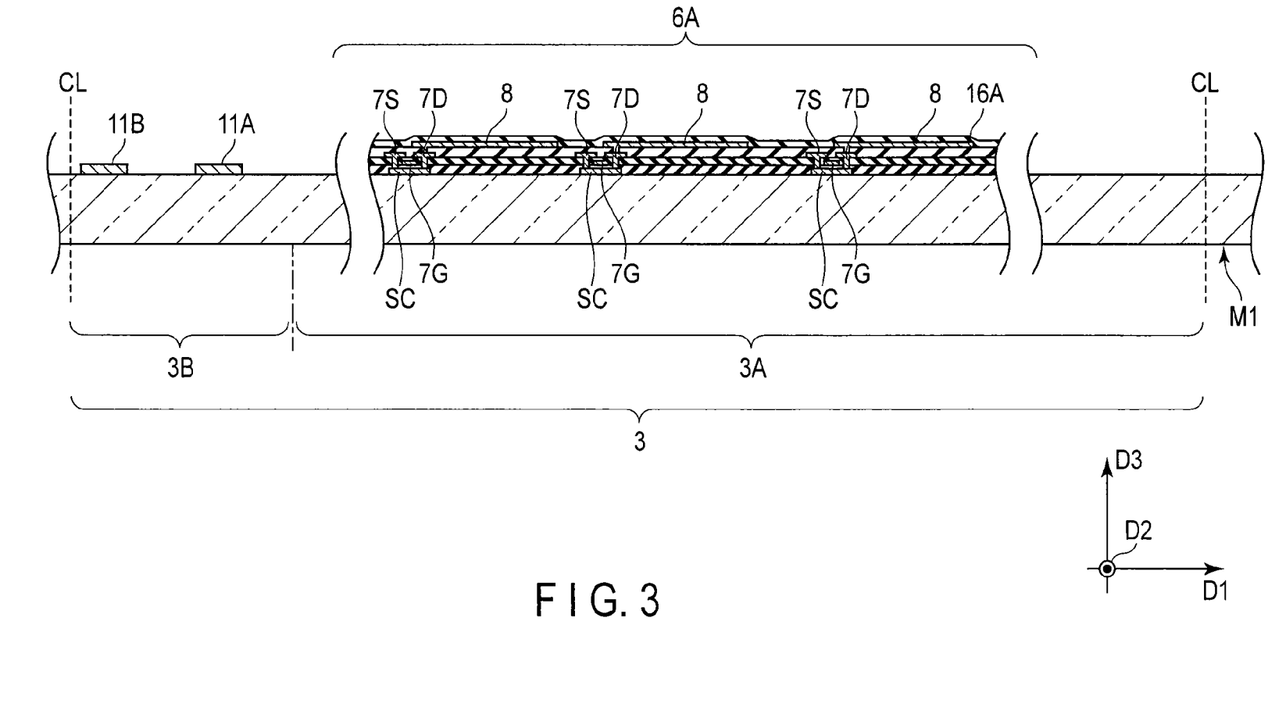
FIG. 3 is a sectional view for explaining a method example of forming a first mother substrate that is to be divided into a plurality of array substrates.

Referring now to FIGS. 3 to 6, a description will be given of a method of manufacturing the liquid crystal display panel 1 constructed as above. FIG. 3 is a cross-sectional view for explaining a method example of forming a first mother substrate M1 that is to be divided into a plurality of array substrates 3.

Firstly, the first mother substrate M1 to be divided into a plurality of array substrates 3 is manufactured. Namely, a transparent insulating substrate is prepared. For instance, this insulating substrate has a size of 730 mm×920 mm. On this insulating substrate, a plurality of first regions 3A each including the display region 6A provided with various wiring, such as the signal lines X and the scanning lines Y, switching elements 7, the pixel electrodes 8 and the orientation film 16A are formed by repeating the forming of metal films and insulating films and the patterning of the films. On the insulating substrate, a plurality of second regions 3B each including the connection sections 11A and 11B and the wiring W led from the display region 6A are also formed by repeating the above processes. Thus, a plurality of display regions 6A are formed in a matrix over substantially the entire surface of the insulating substrate.

Figure 4:
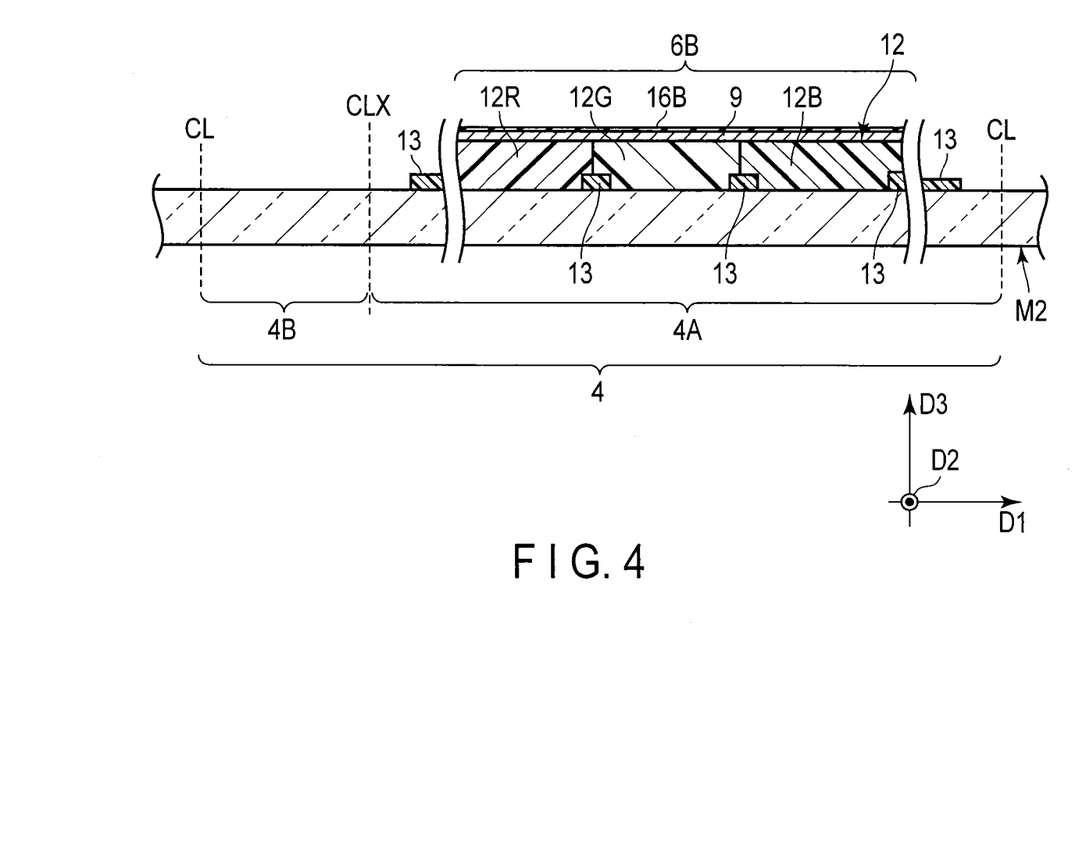
FIG. 4 is a cross-sectional view for explaining a method example of forming a second mother substrate that is to be divided into a plurality of counter substrates.

FIG. 4 is a cross-sectional view for explaining a method example of forming a second mother substrate M2 that is to be divided into a plurality of counter substrates 4.

Subsequently, the second mother substrate M2 to be divided into a plurality of counter substrates 4 is manufactured. Namely, a transparent insulating substrate is prepared. On the insulating substrate, a resin layer colored in black is formed, and is then patterned into the light-shielding layers 13 opposing the spaces between the display pixels in the effective regions 4A and regions enclosing the display regions 6A.

In the process of manufacturing the second mother substrate M2, the color filter layers 12 are formed in the effective regions 4A after forming the light-shielding layers 13. More specifically, a resin film colored in red is formed and then patterned, thereby providing red filters 12R corresponding to the red pixels. Similarly, a resin film colored in green is formed and then patterned, thereby providing green filters 12G corresponding to the green pixels. Further, a resin film colored in blue is formed and then patterned, thereby providing red filters 12B corresponding to the blue pixels.

When forming the light-shielding layers 13 and the color filter layers 12, a plurality of resin layers may be stacked and spacers SS of a predetermined height be formed simultaneously. The spacers SS formed in the display regions 6B are provided in the areas that are shielded by the light-shielding layers 13 and various wiring. The spacers SS may be formed using another resin layer, after the color filter layers are formed.

Further, on the color filter layers 12, a plurality of effective regions 4A each including the display region 6B provided with the counter electrode 9, the orientation film 16B, etc. are formed by repeating the forming of metal films and insulating films and the patterning of the films. As a result, a plurality of display regions 6B are formed in a matrix over substantially the entire surface of the insulating substrate.

Subsequently, a plurality of seal members 15 are formed by tracing on the first mother substrate M1 or the second mother substrate M2. At this time, each seal member 15 is formed in a loop shape that surrounds the corresponding display region 6A or 6B.

After that, a liquid crystal material is dropped onto the regions enclosed by the seal members 15.

Figure 5:
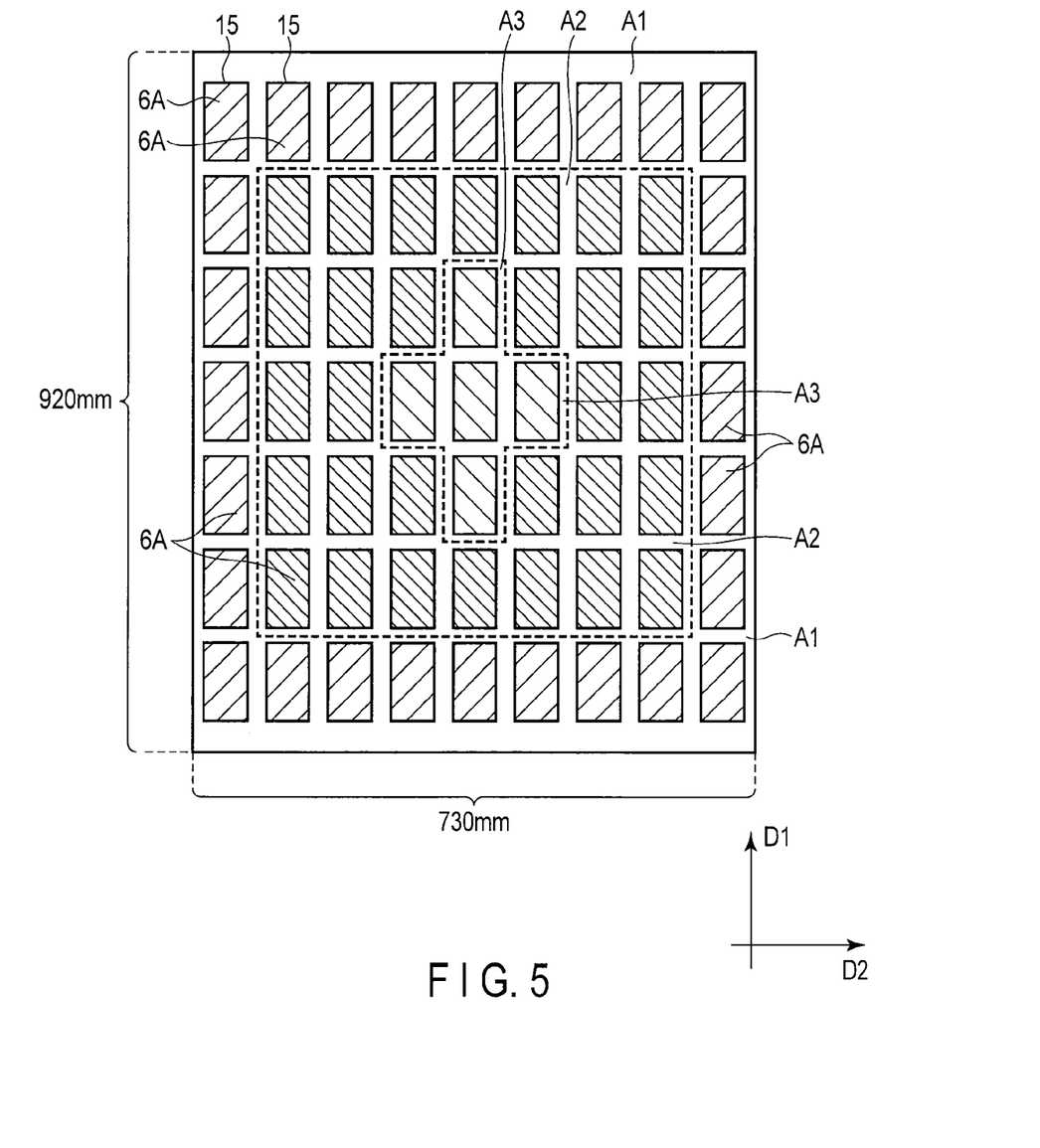
FIG. 5 is a plan view for explaining a process example of dropping a liquid crystal material onto the first or second mother substrate.

FIG. 5 is a plan view for explaining a process example of dropping the liquid crystal material onto the first mother substrate M1 or the second mother substrate M2. In this embodiment, a description will be given of the case where the liquid crystal material is dropped onto the first mother substrate M1 after a plurality of seal members 15 are formed, by tracing, on the first mother substrate M1.

In the embodiment, the drop amount of the liquid crystal material differs depending upon the position of the display regions 6A on the first mother substrate M1. More specifically, the drop amount of the liquid crystal material in the display regions 6A close to an end of the first mother substrate M1 is greater than that of the liquid crystal material in the display regions 6A close to the center of the first mother substrate M1.

The drop amount may be adjusted to decrease stepwise from the end of the first mother substrate M1 to the center thereof. In the example shown in FIG. 5, the drop amount is adjusted in three stages. Suppose that the drop amount of the liquid crystal material in each of the display regions 6A located in a zone A1 along the edges of the first mother substrate M1 is L1, that of the liquid crystal material in each of the display regions 6A located in the central zone A3 of the first mother substrate M1 is L3, and that of the liquid crystal material in each of the display regions 6A located in a zone A2 between the zones A1 and A3. In this case, the drop amount is adjusted to satisfy L1>L2>L3, for example. More specifically, the drop amount L2 is set smaller by 1% than L1, and L3 is set smaller by 1% than L2.

The central zone A3 of the first mother substrate M1 may be defined as the zone located within predetermined distances from the center in the first direction D1 of the substrate M1 and from the center in the second direction D2 of the substrate M1. Alternatively, the central zone A3 may be defined as the zone away from the ends of the first mother substrate M1 more than predetermined distances.

In addition, in the example shown in FIG. 5, the same amount of liquid crystal material is dropped in the display regions 6A positioned in the zone A2 between the zones A1 and A3. However, the drop amount in the display regions 6A positioned in the zone A2 may be varied stepwise. Also in this case, the drop amount is adjusted so that the drop amount in each of the display regions 6A close to the ends of the first mother substrate M1 is greater than that in each of the display regions 6A close to the center of the first mother substrate M1.

After that, the first and second mother substrates M1 and M2 are positioned under vacuum such that the display regions 6A oppose the display regions 6B, and are bonded to each other by irradiating the seal members 15 with, for example, ultraviolet rays to harden them. In this bonding or coupling process, the liquid crystal material vaporizes. The amount of vaporization varies depending upon the position of the display region 6A. More specifically, a greater amount of liquid crystal material vaporizes at the ends of the first mother substrate M1 than at the center thereof.

Consequently, if the drop amount of the liquid crystal material is uniform regardless of the position of each display region 6A, the amount of the liquid crystal material may vary between the display regions 6A on the display section 6 after the bonding process. In this case, the amounts of the liquid crystal material deposited in the portions of the display section 6 close to the ends of the first and second mother substrates M1 and M2 may be less than those deposited in the portions of the display section 6 close to the central portions of the first and second mother substrates M1 and M2. If a small amount of liquid crystal material is deposited, air bubbles may occur within the liquid crystal layer 5 at a low temperature, thereby degrading the display quality. In contrast, if a great amount of liquid crystal material is deposited, the thickness of the liquid crystal layer 5 may become ununiform due to gravity, thereby causing ununiform display.

In view of the above, in the embodiment, the amount of the liquid crystal material dropped onto the display regions 6A or 6B is adjusted in accordance with the positions of the display regions on the first or second mother substrate M1 or M2, thereby minimizing variation in the amount of the liquid crystal material deposited in the display section 6, after the bonding process. As a result, the embodiment can provide a method of manufacturing, with an improved yield, liquid crystal display devices free from occurrence of air bubbles at low temperature and from ununiform display.

Figure 6:
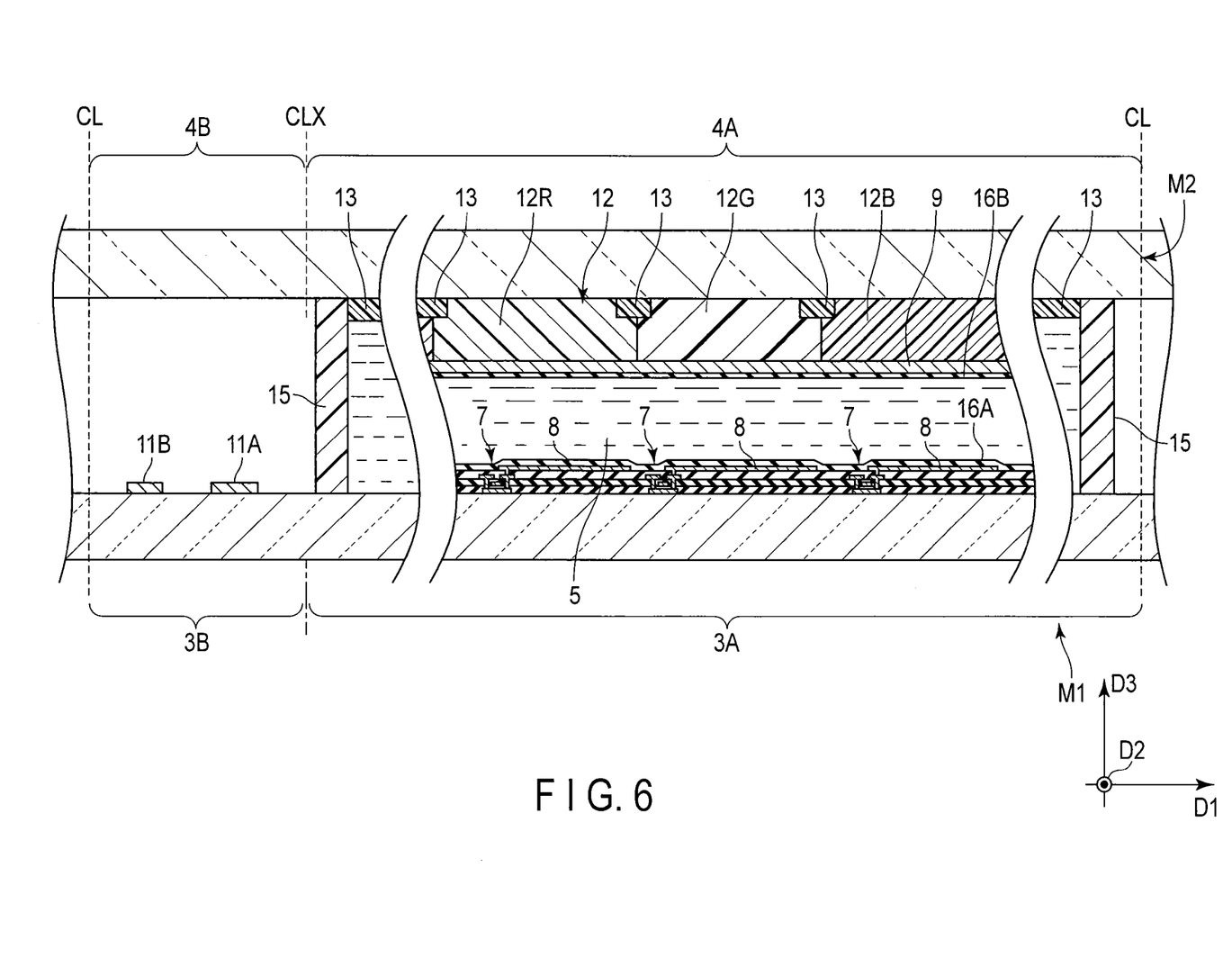
FIG. 6 is a cross-sectional view showing a structure example of the first and second mother substrates adhered to each other.

FIG. 6 is a cross-sectional view showing a structure example of the first and second mother substrates bonded or adhered to each other.

Thereafter, as shown in FIG. 6, the adhered first and second mother substrates M1 and M2 are cut, along cutting lines CL and CLX, into first and second regions 3A and 3B that will serve as the array substrates 3, and into effective regions 4A that will serve as the counter substrates 4. The elimination regions 4B of the second mother substrate M2 are eliminated, thereby providing a liquid crystal display panel 1 in which the first region 3A is opposed to the effective region 4A, and the second region 3B extend from an end 4E of the effective regions 4A.

As described above, the embodiment can provide a method of manufacturing liquid crystal display devices with an improved yield.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a liquid crystal display device, comprising:
    forming a first mother substrate including a plurality of first display regions;
    forming a second mother substrate including a plurality of second display regions;
    forming seal members of a loop shape around the first or second display regions;
    dropping a liquid crystal material onto the first or second display regions surrounded by the respective seal members; and
    bonding the first and second mother substrates to each other by the seal members such that the first display regions oppose the second display regions,
    wherein in the dropping the liquid crystal material, a greater amount of the liquid crystal material is dropped onto display regions included in the first or second display regions and close to ends of the first or second mother substrate, than onto display regions included in the first or second display regions and close to a center of the first or second mother substrate.

2. The method of claim 1, wherein in the dropping the liquid crystal material, two or more drop amounts are set for the liquid crystal material, based on distances from the ends or the center of the first or second mother substrate.

3. The method of claim 2, wherein in the dropping the liquid crystal material, L1>L2>L3 is satisfied, where L1 is a drop amount of the liquid crystal material in display regions included in the first or second display regions and close to the ends of the first or second mother substrate, L3 is a drop amount of the liquid crystal material in display regions included in the first or second display regions and close to the center of the first or second mother substrate, and L2 is a drop amount of the liquid crystal material in display regions included in the first or second display regions and excluding the display regions close to the ends and the center of the first or second mother substrate.

4. The method of claim 1, wherein the bonding the first and second mother substrates to each other comprises irradiating the seal members with light to harden the seal members.

5. The method of claim 1, wherein in the dropping the liquid crystal material, L1>L2>L3 is satisfied, where L1 is a drop amount of the liquid crystal material in display regions included in the first or second display regions and close to the ends of the first or second mother substrate, L3 is a drop amount of the liquid crystal material in display regions included in the first or second display regions and close to the center of the first or second mother substrate, and L2 is a drop amount of the liquid crystal material in display regions included in the first or second display regions and excluding the display regions close to the ends and the center of the first or second mother substrate.

* * * * *